United States Patent
Erickson

(10) Patent No.: US 6,722,635 B2
(45) Date of Patent: Apr. 20, 2004

(54) MULTIPLE SCREW JACK

(75) Inventor: John Scott Erickson, Roscoe, IL (US)

(73) Assignee: Atwood Mobile Products, Inc., Elkhart, IN (US)

( * ) Notice: Subject to any disclaimer, the term of this patent is extended or adjusted under 35 U.S.C. 154(b) by 0 days.

(21) Appl. No.: 10/022,604

(22) Filed: Dec. 17, 2001

(65) Prior Publication Data

US 2003/0111656 A1 Jun. 19, 2003

(51) Int. Cl.⁷ ................................................ B66F 7/14
(52) U.S. Cl. ...................... 254/103; 254/425; 254/89 R
(58) Field of Search ................................ 254/419, 420, 254/424, 425, 103, 89 R; 269/60, 61

(56) References Cited

U.S. PATENT DOCUMENTS

| | | | |
|---|---|---|---|
| 1,034,632 A | * | 8/1912 | Maley ........................ 187/267 |
| 3,514,090 A | * | 5/1970 | Wuesthoff ................... 254/103 |
| 4,061,309 A | | 12/1977 | Hanser |
| 4,067,543 A | | 1/1978 | Orth et al. |
| 4,082,249 A | | 4/1978 | Valdespino et al. |
| 4,084,830 A | | 4/1978 | Daniel, Jr. et al. |
| 4,141,395 A | * | 2/1979 | Arzt ........................ 180/53.61 |
| 4,165,861 A | | 8/1979 | Hanser |
| 4,174,094 A | | 11/1979 | Valdespino et al. |
| 4,216,939 A | | 8/1980 | Valdespino |
| 4,330,105 A | * | 5/1982 | Gallagher ................. 254/89 R |
| 4,396,047 A | * | 8/1983 | Balkus ........................ 254/103 |
| 4,558,886 A | | 12/1985 | Straub |
| 4,597,584 A | | 7/1986 | Hanser |
| 4,635,904 A | * | 1/1987 | Whittingham .............. 254/425 |
| 4,641,843 A | | 2/1987 | Morrisroe, Jr. |
| 4,678,041 A | | 7/1987 | Staudinger |
| 4,743,037 A | | 5/1988 | Hanser |
| 4,746,133 A | | 5/1988 | Hanser et al. |
| 4,784,400 A | | 11/1988 | Hofius |
| 4,815,711 A | | 3/1989 | Bruno et al. |
| 4,865,295 A | | 9/1989 | Holloway |
| 4,887,840 A | | 12/1989 | Harara et al. |
| 4,974,861 A | | 12/1990 | Itoh et al. |
| 5,013,011 A | | 5/1991 | Halloway |
| 5,176,391 A | | 1/1993 | Schneider et al. |
| 5,188,379 A | | 2/1993 | Krause et al. |
| 5,676,385 A | | 10/1997 | Schneider et al. |
| 5,826,889 A | | 10/1998 | Eden |
| 5,890,721 A | | 4/1999 | Schneider et al. |
| 5,901,969 A | | 5/1999 | Schneider et al. |
| 5,913,525 A | | 6/1999 | Schneider et al. |
| 5,915,700 A | | 6/1999 | Schneider et al. |

\* cited by examiner

*Primary Examiner*—Robert C. Watson
(74) *Attorney, Agent, or Firm*—Peter D. McDermott; Casimir R. Kiczek

(57) ABSTRACT

A jack includes a motor, a gear assembly operably connected to the motor, a ram, and a plurality of screws driven by the gear assembly to move the ram.

4 Claims, 4 Drawing Sheets

MULTIPLE SCREW JACK

FIELD OF THE INVENTION

This invention relates generally to the field of jacks, and, more particularly, to jacks actuated by screw assemblies.

BACKGROUND OF THE INVENTION

Screw jacks are known to be used in various applications, including leveling and supporting vehicles such as recreational vehicles and trailers. Such jacks have a single screw that is rotated by way of a motor and gear assembly to raise and lower the vehicle.

U.S. Pat. No. 4,067,543 to Orth et al. discloses a retractable jack having a jackscrew threaded in a jackscrew nut. A motor and associated gear assembly rotatably drives the jackscrew. Orth is limiting in that only a single jackscrew is provided and, therefore, no redundancy is provided in the event of failure of the screw. Additionally, significant torque is required to lift the load with the use of a single screw.

It is an object of the present invention to provide a jack that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of preferred embodiments.

SUMMARY

The principles of the invention may be used to advantage to provide a jack having a plurality of screws. The plurality of screws allows for smaller diameter screws to be used, easing manufacturing and improving availability. Additionally, smaller diameter screws are less affected by rotational friction, thereby reducing the torque required to operate the jack. Using a plurality of screws also provides redundancy of components, and, therefore, enhances safety.

In accordance with a first aspect, a jack includes a motor, a gear assembly operably connected to the motor, a ram, and a plurality of screw assemblies driven by the gear assembly to move the ram.

In accordance with another aspect, a jack includes a motor. A gear assembly has a pinion gear operably connected to and driven by the motor, and a plurality of screw gears. Each screw gear is driven by the pinion gear. A ram is slidably received in a housing, and a thrust plate is secured to the housing. Each screw of a plurality of screw assemblies is operably connected to the ram, axially fixed with respect to the thrust plate, and driven by a screw gear to move the ram with respect to the thrust plate.

In accordance with another aspect, a jack includes a motor and a gear assembly. The gear assembly has a pinion gear operably connected to and driven by the motor, and three screw gears. Each screw gear is driven by the pinion gear. A ram is slidably received in a housing, and a thrust plate is secured to the housing. Each of three ball screws is operably connected to the ram, axially fixed with respect to the thrust plate, and driven by a screw gear to move the ram with respect to the thrust plate.

From the foregoing disclosure, it will be readily apparent to those skilled in the art, that is, those who are knowledgeable or experienced in this area of technology, that the present invention provides a significant advance. Preferred embodiments of the jack of the present invention can provide a jack that operates with reduced torque, has increased safety, and minimizes manufacturing costs. These and additional features and advantages of the invention disclosed here will be further understood from the following detailed disclosure of preferred embodiments.

Figure 1:
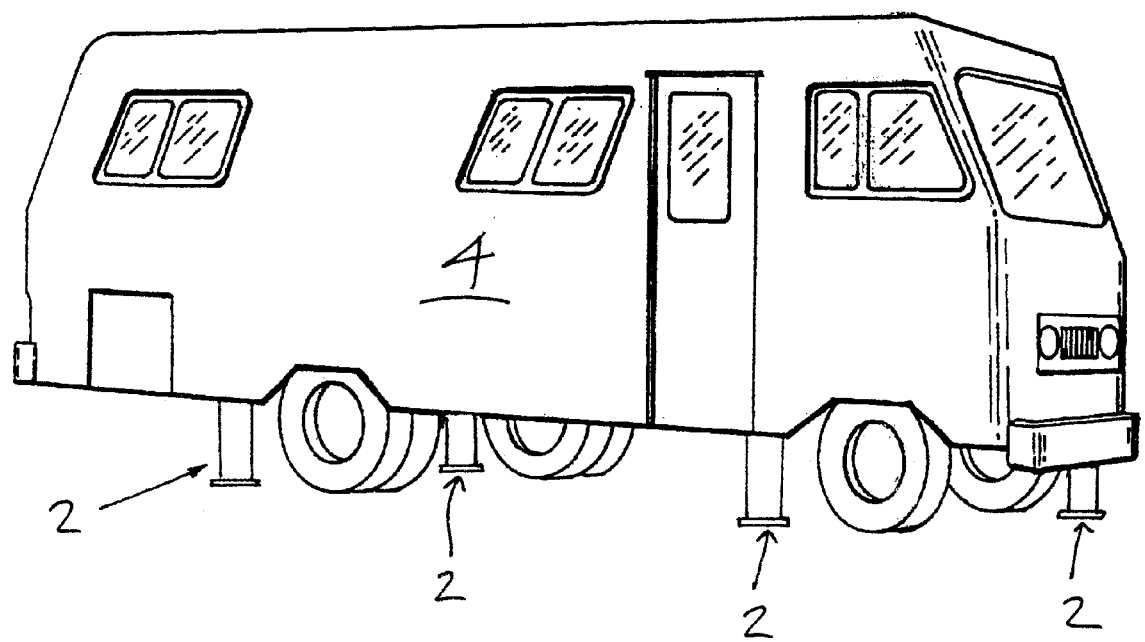
FIG. 1 is a perspective view of a vehicle shown with four jacks in accordance with a preferred embodiment of the present invention.

It should be understood that the appended drawings are not necessarily to scale, presenting a somewhat simplified representation of certain preferred embodiments illustrative of the basic principles of the invention. The specific design of jacks in accordance with the invention, including, for example, specific configurations and dimensions of the jack and its components will be determined in part by the intended application and use environment. Certain features of the assembly have been enlarged or distorted relative to others to facilitate visualization and clear understanding. In particular, thin features may be thickened, for example, for clarity of illustration. All references to direction and position, unless otherwise indicated, refer to the orientation of the jack illustrated in the drawings. It should be understood that jacks in accordance with the invention could be used in diverse applications.

DETAILED DESCRIPTION OF THE INVENTION

Certain preferred embodiments of the jack of the present invention are suitable for lifting and supporting vehicles, such as recreational vehicles, as trailer fifth wheels, and as center-mount jacks for trailers, e.g., horse and commercial trailers. However, it will be readily apparent to those skilled in the art, given the benefit of this disclosure, that other applications for jacks providing both vertical and horizontal linear actuation are considered within the scope of the invention.

Referring now to one preferred embodiment depicted in FIG. 1, a plurality of jacks 2 in accordance with the present invention are seen to be installed on a vehicle 4 to lift, level, and support vehicle 4. In the illustrated embodiment, vehicle 4 has four jacks 2, however, it is to be appreciated that any number of jacks may be used in accordance with the principles of the present invention.

Figure 2:
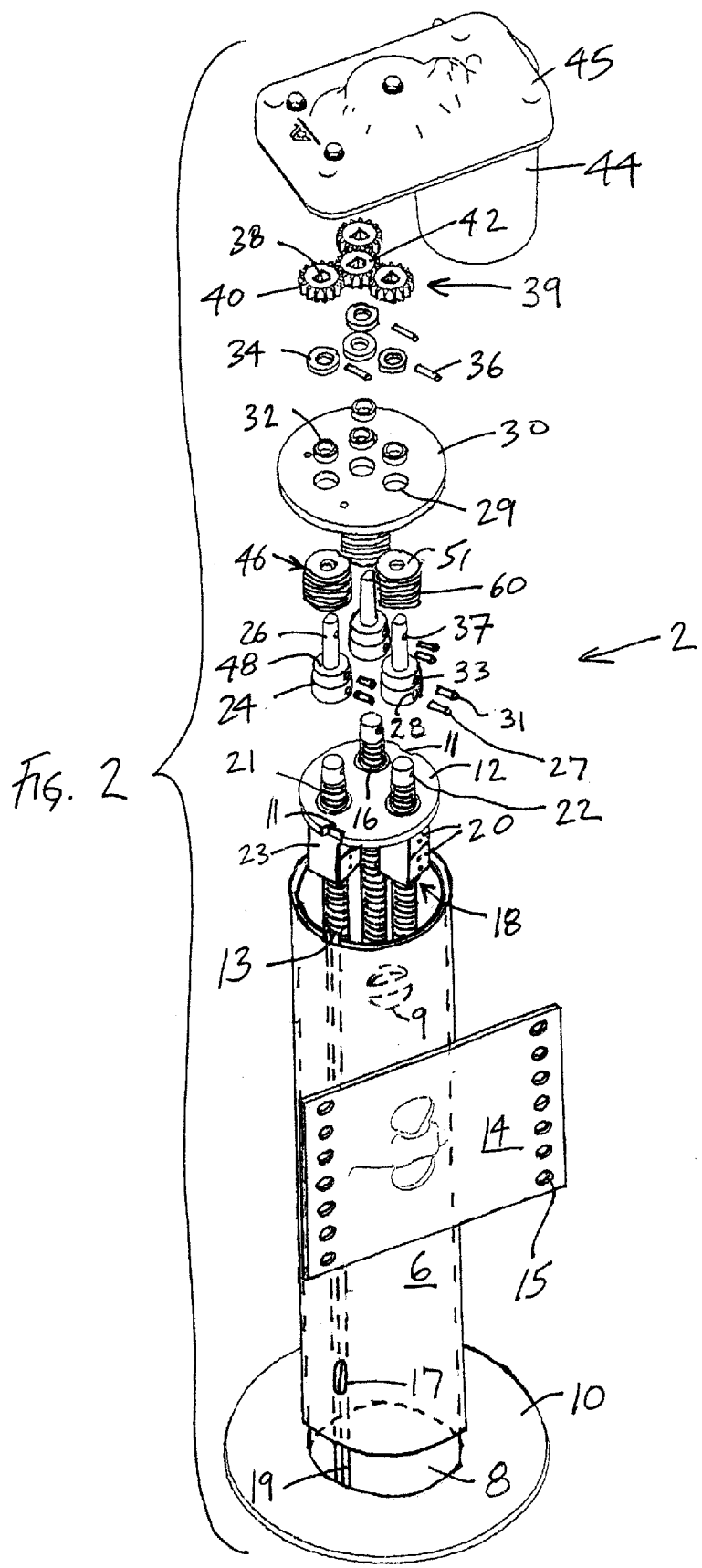
FIG. 2 is an exploded view of a preferred embodiment of the jack of FIG. 1.

A preferred embodiment of a jack 2, seen more clearly in exploded form in FIG. 2, has a housing 6, within which a ram 8 is slidably received. A base plate 10 is secured at one end of ram 8, shown in this embodiment as the lower end of ram 8. A flange 12 is secured to the ram 8 with a pair of lances 9 formed in ram 8. In a preferred embodiment, each lance 9 is formed by cutting two semi-circular slits in ram 8 and bending the semicircular cut portions of the ram inward, providing a slot within which flange 12 is received so as to secure flange 12 axially with respect to ram 8. A pair of opposed recesses 11 in flange 12 mates with ridges 13 formed in ram 8 to properly mate flange 12 with ram 8 and prevent rotational movement between ram 8 and flange 12. A projection 17 formed in housing 6 is slidably received in a slot 19 formed in ram 8 to prevent rotational movement between housing 6 and ram 8. A bracket 14 is secured to housing 6. Bolts or other suitable fasteners (not shown) extending through apertures 15 in bracket 14 are used to secure jack 2 to vehicle 4. It is to be appreciated that other fastening means for securing jack 2 to vehicle 4 may be used, and such suitable fastening means will become readily apparent to those skilled in the art, given the benefit of this disclosure.

A plurality of threaded apertures 16 is formed in flange 12. In the illustrated embodiment, screw assemblies 18 are ball screws, formed of a screw 21 and a nut 23. Each nut 23 is screwed into a threaded aperture 16 and subsequently welded to flange 12, thereby securing it to flange 12. Each screw 21 extends through a corresponding aperture 16. As screws 21 rotate, flange 12 and ram 8, which are secured to nuts 23, move with respect to screws 21. Each screw 21 has an aperture 22 formed proximate an end thereof.

In the illustrated embodiment, there are three screw assemblies 18 and three corresponding apertures 16. However, it is to be appreciated that a jack having two, or four, or more than four screw assemblies is considered to be within the scope of the invention. In a preferred embodiment, each nut 23 of a ball screw assembly 18 has two sets of recirculating balls in corresponding return tubes (not visible here as they are covered by plates 20) to improve performance, increase the life cycle, and reduce the chances of catastrophic failure. It is to be appreciated that other screws types are considered within the scope of the invention, e.g., ball screw assemblies with more or less than two sets of recirculating balls and corresponding numbers of return tubes, acme screws, including single and multi-lead screws.

A coupling 24 having a drive shaft 26 extending outwardly therefrom is secured to an end of each screw 21. A pin 27 extends through an aperture 28 in coupling 24 and a corresponding aperture 22 in screw 21, thereby securing coupling 24 to screw assembly 118. Drive shaft 26 is secured to coupling 24 by a pin 31 extending through an aperture 33 in coupling 24 and a corresponding aperture (not seen) in drive shaft 26. Each drive shaft 26 preferably has a D shaped cross section on at least an end portion thereof. Drive shafts 26 extend through apertures 29 formed in a thrust plate 30. Thrust plate 30 is secured to housing 6, by suitable fastening means, e.g., welding. A bushing 32 is positioned on each drive shaft 26 in abutting relationship with thrust plate 30. A washer 34 is then positioned on each drive shaft 26 in abutting relationship with bushing 32. It is to be appreciated that in the illustrated embodiment, washer 34 acts as a bearing when screws 12 are in retraction. Thus, washer 34 can be a solid element, or a rolling type bearing, depending on the type and amount of load that the jack encounters. Consequently, jack 2 can act in compression as well as tension.

A drive pin 36 is inserted into an aperture 37 formed in each drive shaft 26, thereby axially fixing screw assemblies 18 with respect to thrust plate 30. A drive assembly 39 rotatably drives drive shafts 26. In a preferred embodiment, drive assembly 39 includes drive gears 40 and a pinion gear 42. Drive gears 40 each preferably have a D shaped aperture 38 to receive a drive shaft 26. Drive gears 40 are driven by pinion gear 42, which is in turn driven by a shaft, not seen, of a motor 44 housed in a motor housing 45. The motor shaft extends through pinion gear 42, through a corresponding washer 34 and bushing 32 and is received in a central aperture 29 in thrust plate 30, which provides guidance and support for the shaft.

Figure 4:
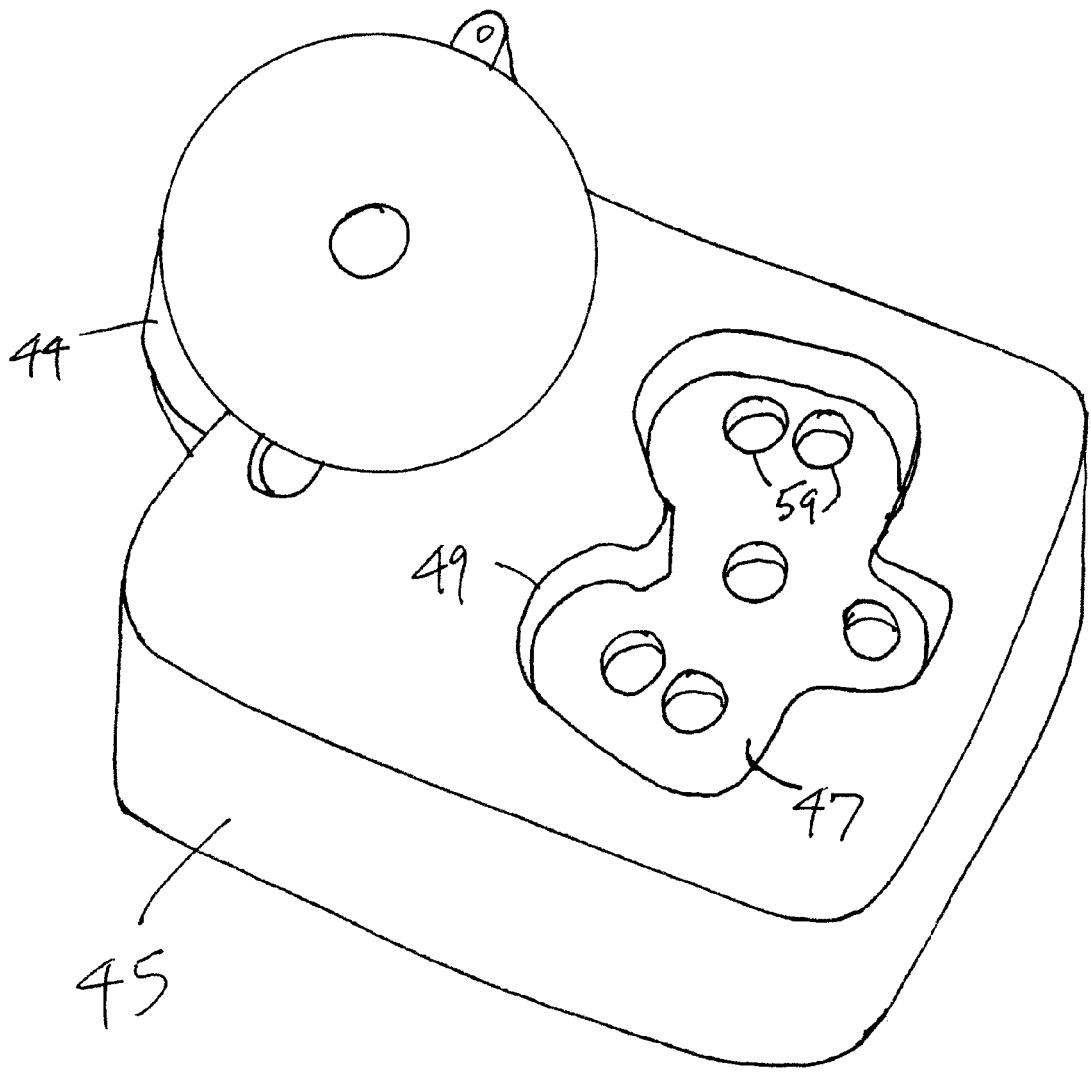
FIG. 4 is a perspective view of the bottom side of the motor housing of the jack of FIG. 2.

It is to be appreciated that in certain preferred embodiments, as seen in FIG. 4, an under surface of motor housing 45 includes a gearbox 47 that receives drive assembly 39. Gearbox 47 is formed as a recess in motor housing 45, includes a plurality of apertures 59 that receive corresponding drive shafts 26, and optionally includes a plurality of lobes 49. By having a plurality of lobes and apertures, a single gearbox 47 can accommodate drive assemblies having different numbers of drive gears 40, thereby reducing manufacturing costs. In the illustrated embodiment, gearbox 47 can accommodate a drive assembly with two or three drive gears 40.

In operation, motor 44 drives pinion gear 42, which in turn causes rotation of drive gears 40. Drive gears 40 transfer this rotational movement to drive shafts 26. Couplings 24 then transfer the rotational movement to screws 21. Since nuts 23 are secured to flange 12, as screws 21 rotate they cause flange 12 and ram 8 to move downwardly along with nuts 23, thereby translating the rotational movement of drive screws 40 into a linear movement of ram 8. Ram 8 moves until base plate 10 encounters a resisting force, such as the ground, at which point, the continued linear movement causes thrust plate 30, and, consequently housing 6 and vehicle 4 to which it is secured, to move upwardly in the opposite direction, lifting vehicle 4. The amount of travel of screw assemblies 18, and, therefore, ram 8 will vary depending on the intended use and size of the components of jack 2. In certain preferred embodiments, screw assemblies 18 are approximately ¾" in diameter, and travel approximately 15". Suitable diameters and lengths of travel for screw assemblies 18 will become readily apparent to those skilled in the art, given the benefit of this disclosure.

Although the illustrated embodiment shows a vehicle 4 being lifted vertically by jacks 2, it is to be appreciated that other orientations of jacks 2 are considered to be within the scope of the invention. Therefore, the linear movement produced by jack 2 can be oriented in a horizontal direction, or in any other desired direction, and can be applied in an unlimited number of industries.

In a preferred embodiment, brakes 46 are provided on each screw assembly 18. In a preferred embodiment, brakes 46 are wrap spring brakes. Brakes 46 are positioned on drive shaft 26 between thrust plate 30 and an upper surface 48 of coupling 24. A brake 46 is more clearly seen in exploded fashion in FIG. 3. Brake 46 includes top cup 50 within which a bearing 52 is received. A lower surface of bearing 52 rests on an upper surface 56 of a bottom cup 58. A spring 60 then receives upper cup 50 and bottom cup 58, as seen in FIG. 2. The friction between an upper surface 51 of top cup 50 and a lower surface of thrust plate 30 causes top cup 50 to essentially embed in the lower surface of thrust plate 30, thereby securing top cup 50 to thrust plate 30. Drive shaft 26 extends through a central aperture 53 formed in top cup 50, a central aperture 55 formed in bearing 52, and a central aperture 54 formed in bottom cup 58. A lower surface of bottom cup 58 rests on upper surface 48 of coupling 24. Upper surface 48 of coupling 24 and the lower surface of bottom cup 58 are preferably hardened. In certain preferred embodiments, recesses or detents are formed on the under surface of bottom cup 58 (not shown) to form grease pockets. These grease pockets can serve to control the friction between bottom cup 58 and coupling 24, optimizing the torque required to rotate screws 21.

Figure 3:
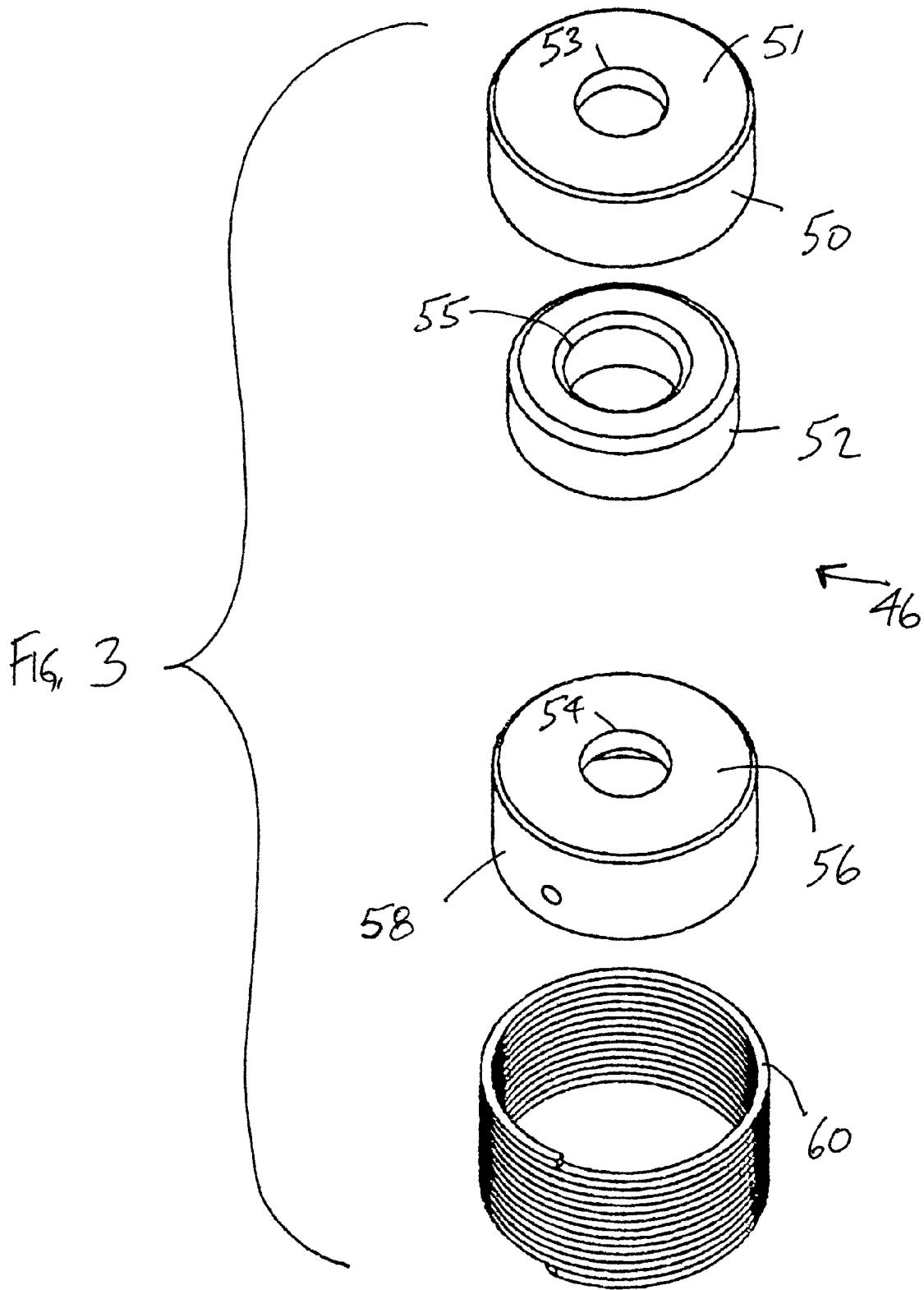
FIG. 3 is an exploded view of a brake of the jack of FIG. 2.

When screws 21 are extended, e.g., when jacks 2 are lifting vehicle 4, motor 44 causes screws 21 to rotate in a particular direction (counterclockwise as seen from above in the illustrated embodiment of FIGS. 2, 3). As each screw 21 rotates in this direction, each spring 60 relaxes, allowing bottom cup 58 to rotate freely with respect to top cup 50 via bearing 52. The friction between upper surface 51 of top cup 50 and the lower surface of thrust plate 30 prevents rotation of top cup 50 with respect to thrust plate 30. Similarly, the friction between bottom cup 58 and coupling 24 causes them to rotate together. Since coupling 24 and bottom cup 58 rotate freely as a unit, as noted above, screws 21, which are secured to couplings 24, freely rotate and extend, providing linear motion for ram 6 and lifting vehicle 4.

Brake 46 works in known fashion to prevent back drive of screw assemblies 18 under the load of vehicle 4. When jack 2 is in a rest position, the weight of the vehicle on the jacks causes screws 21 to tend to rotate in the direction of retraction (clockwise as seen from above in the illustrated embodiment). This rotation causes spring 60 to tighten on bottom cup 58 and top cup 50, disabling the function of bearing 52 and the free rotation of bottom cup 58 with respect to top cup 50. Since friction prevents rotation between top cup 50 and thrust plate 30 and between bottom cup 58 and coupling 24, and since screws 21 are directly secured to coupling 24, rotation of screws 21 and, therefore, back drive is prevented.

In order to retract screws 21, motor 44 is used to overcome the friction forces. Specifically, the torque generated by motor 44 easily overcomes the friction between the hardened surfaces of upper surface 48 of coupling 24 and the bottom surface of bottom cup 58, allowing coupling 24 to rotate with respect to bottom cup 58, and, therefore, allowing screws 21 to rotate in the direction of retraction (clockwise as seen from above in this embodiment), resulting in a controlled lowering of the jack and the vehicle. It is to be appreciated that spring 60 may have an orientation preventing rotation of screws 21 in either a clockwise or counterclockwise direction.

Having a plurality of screw assemblies 18 associated with each jack 2 provides numerous advantages. The use of multiple screw assemblies allows smaller diameter screws to be used, which are simpler to manufacture and more readily available. Smaller diameter screws are also less affected by the rotational friction applied to the screw threads, and a lower torque is required to lift the jack when multiple screws are used. Additionally, the redundancy of the components of a jack with multiple screws provides additional safety in the event of the failure of a component. For example, if a brake were to fail or under perform, the other brake or brakes still provide braking, minimizing dependency on the secondary brake, that is, the motor with its leads crossed in known fashion.

Since there are multiple drive gears 40 driving multiple screw assemblies 18, proper timing of the screw gears is required. In order to provide the proper timing, a parallelism within 0.010" of the top surfaces 51 of top cups 50 is required. To ensure the proper parallelism in a preferred embodiment, nuts 23 are first fixed to flange 12. Couplings 24 and corresponding drive shafts 26 are then attached to screw assemblies 18, and brakes 46 are placed in position on drive shafts 26. Screws 21 are then rotated a defined distance until top surfaces 48 of couplings 24 are parallel to each other within approximately 0.010". After ensuring that the flat surfaces of the D shaped drive shafts 26 are in a defined relationship with one another, i.e., parallel within approximately 0.005" or spaced apart 120°, apertures 28, 22 are drilled in couplings 24 and screws 21, respectively, into which pins 27 are inserted. This defined relationship between the drive shafts allows proper alignment of the gears. Screws 21 are then extended the same defined amount, greater than approximately 0.500", and the flat surfaces of the D shaped drive shafts 26 are aligned in a defined relationship with one another, i.e., parallel within approximately 0.005" or spaced apart 120°. Brakes 46 are then positioned on drive shafts 26 and the remaining components are installed.

Another method of ensuring proper alignment and timing of screw gears 40 involves the use of equal torque. Specifically, each screw 12 is extended an equal amount, e.g., approximately 0.500". Brakes 46 are placed on drive shafts 26, and thrust plate 30 is placed over drive shafts 26. An individual then ensures that each brake 46 is tightened against thrust plate 30 with the same amount of torque. The remaining components can then be installed. In this manner, parallelism of the components, and therefore, proper timing of screw gears 40 is ensured.

It should be understood that the preferred embodiments disclosed herein are by way of example only and merely illustrative of but a small number of the many possible specific embodiments that can represent applications of the principles of the present invention. In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

I claim:

1. A jack comprising, in combination:
    a motor;
    a gear assembly operably connected to the motor;
    a ram;
    a plurality of screw assemblies driven by the gear assembly to move the ram; and
    a flange secured to the ram, the flange having a plurality of apertures, each screw assembly extending through a corresponding aperture.

2. A jack comprising, in combination:
    a motor;
    a gear assembly operably connected to the motor;
    a ram;
    a plurality of screw assemblies driven by the gear assembly to move the ram, each screw assembly having a screw and a nut; and
    a unitary flange secured to the ram, the flange having a plurality of threaded apertures, each screw extending through a corresponding aperture.

3. The jack of claim 1, further comprising a housing within which the ram is slidably received, the housing comprising a projection slidably received in a slot formed in the ram to prevent rotational movement between the ram and the housing.

4. The jack of claim 1, further comprising a housing within which the ram is slidably received, a thrust plate secured to the housing, and a spring disposed between the thrust plate and the flange.

* * * * *